No. 802,619. PATENTED OCT. 24, 1905.
J. H. ANDERTON.
SYSTEM OF ELECTRICAL DISTRIBUTION.
APPLICATION FILED FEB. 28, 1905.
2 SHEETS—SHEET 1.
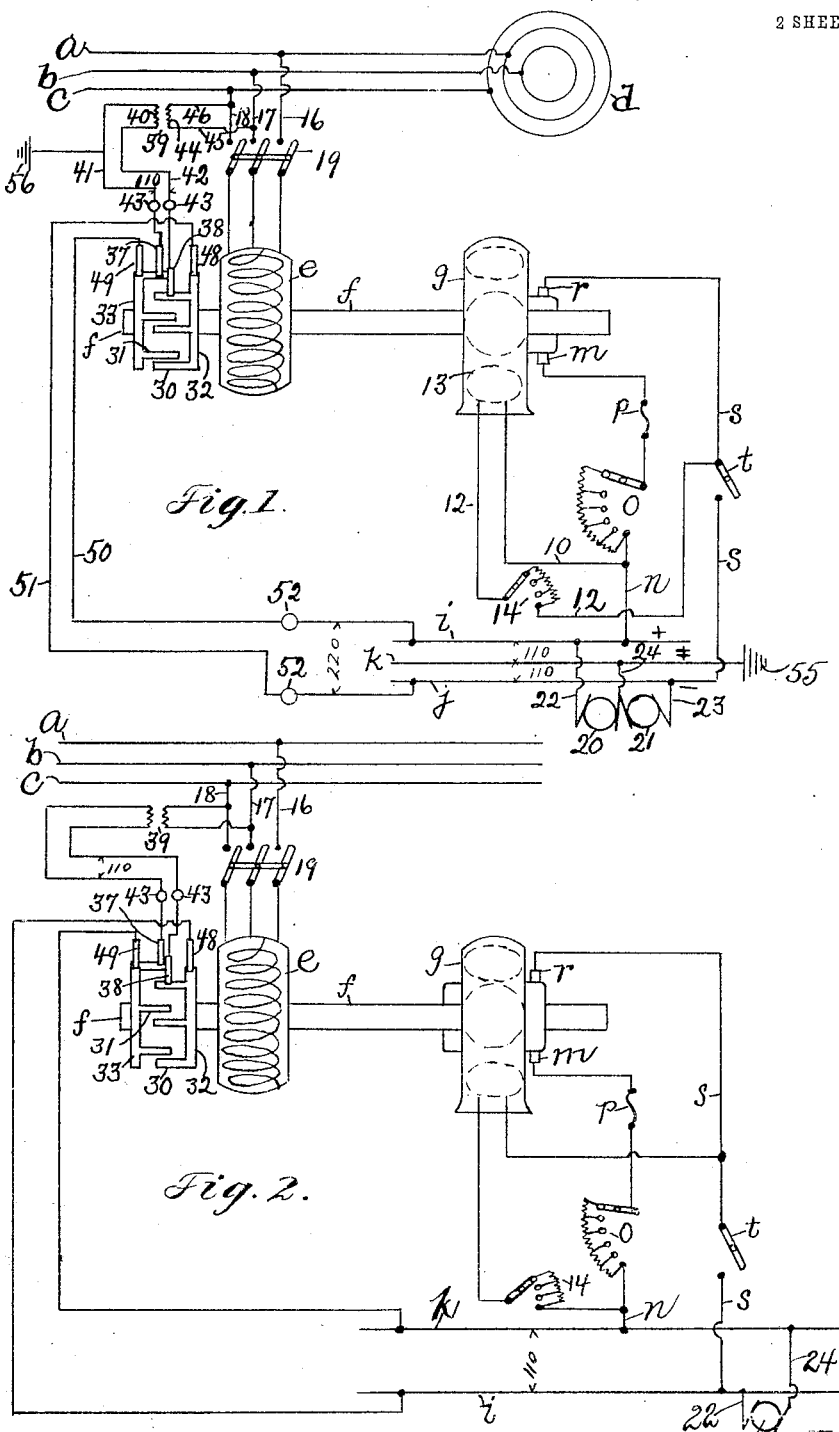

No. 802,619. PATENTED OCT. 24, 1905.
J. H. ANDERTON.
SYSTEM OF ELECTRICAL DISTRIBUTION.
APPLICATION FILED FEB. 28, 1905.
2 SHEETS—SHEET 2.
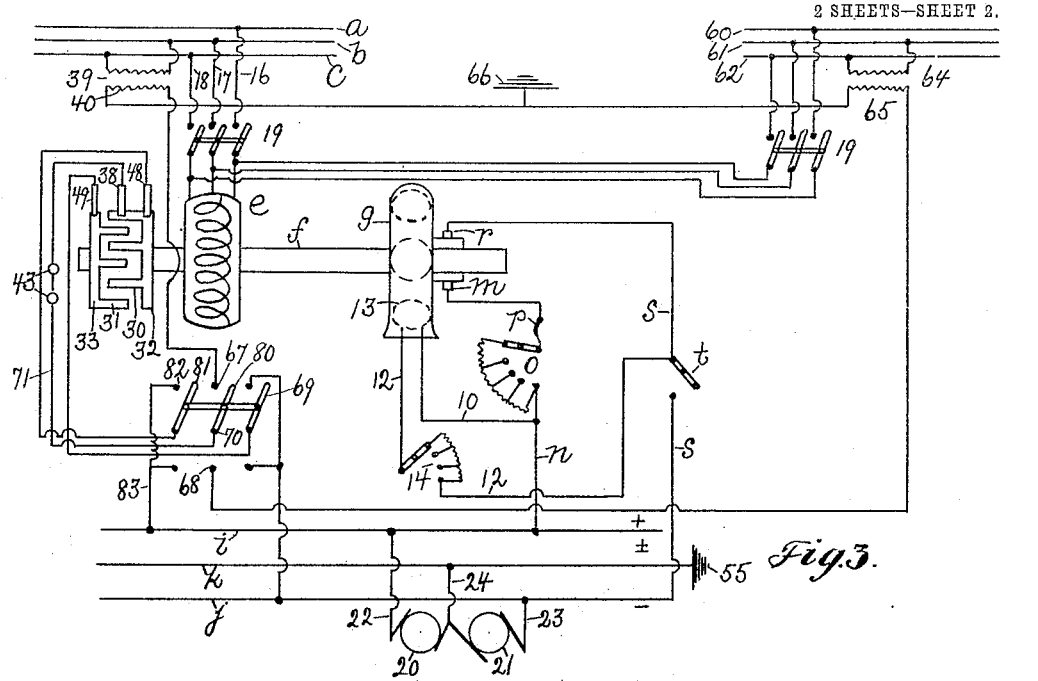
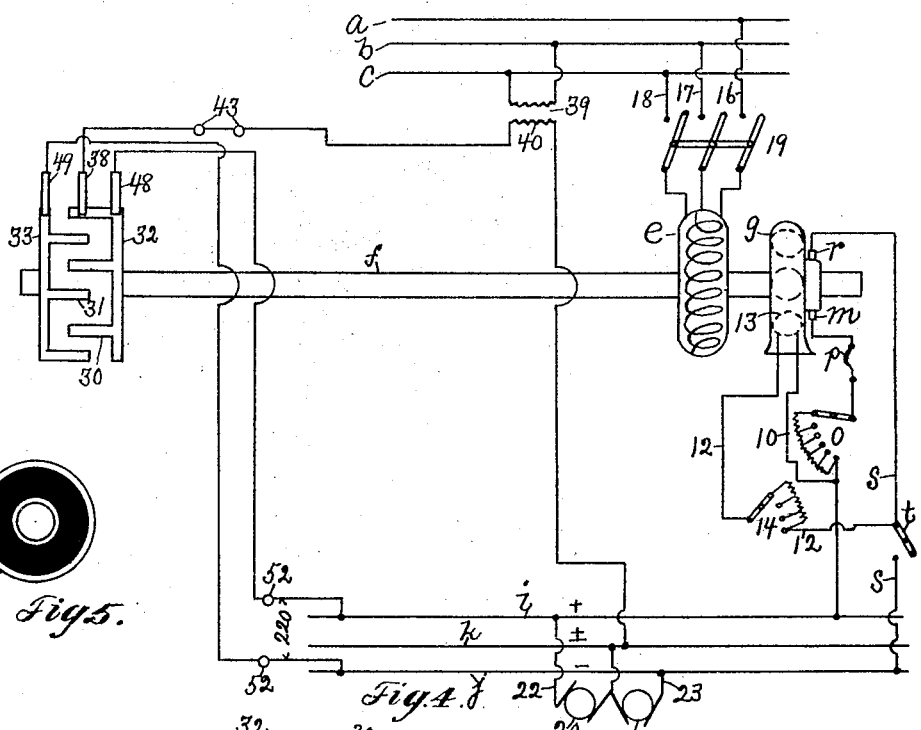
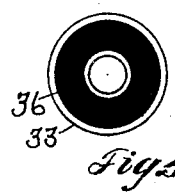
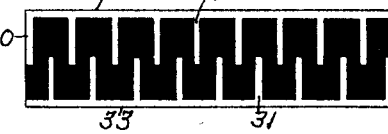

UNITED STATES PATENT OFFICE

JOHN H. ANDERTON, OF BOSTON, MASSACHUSETTS, ASSIGNOR TO ALBERT AND J. M. ANDERSON MANUFACTURING COMPANY, OF PORTLAND, MAINE.

SYSTEM OF ELECTRICAL DISTRIBUTION.

No. 802,619.     Specification of Letters Patent.     Patented Oct. 24, 1905.

Application filed February 28, 1905. Serial No. 247,651.

*To all whom it may concern:*

Be it known that I, JOHN H. ANDERTON, a citizen of the United States, residing in Boston, in the county of Suffolk and State of Massachusetts, have invented an Improvement in Systems of Electrical Distribution, of which the following description, in connection with the accompanying drawings, is a specification, like characters on the drawings representing like parts.

This invention relates to a system of electrical distribution wherein an alternating current is employed to operate a motor which drives a direct-current generator, and is especially adapted for use in systems of the class described in which an induction-motor is employed to drive the direct-current generator.

The invention has for its object to provide means whereby it may be made known to the operator when the induction-motor may be connected in the alternating-current circuit with safety. For this purpose I employ a device for converting a direct current into an alternating current which is supplied to a circuit containing a translating device or devices, preferably incandescent lamps, which are also supplied with an alternating current derived from the primary alternating-current circuit, whereby the phase relationship of the alternating current derived from the direct-current circuit to the primary alternating current may be determined or indicated at any desired point, which may be in proximity to or remote from the direct-current generator, and thereby furnish the operator with knowledge of when he may with safety connect the induction-motor with the alternating circuit. These and other features of this invention will be pointed out in the claims at the end of this specification.

Figure 1 is a diagram of a system of electrical distribution embodying this invention; Figs. 2, 3, and 4, diagrams illustrating different systems which embody the invention, and Figs. 5 and 6 details to be referred to.

Referring to Fig. 1, *a b c* represent the conductors of a primary circuit carrying a three-phase alternating current, which is supplied from a three-phase generator *d* of any suitable or desired construction and which current is employed to operate an induction-motor *e* of any usual or suitable construction, which is provided with the shaft *f*, upon which is mounted the armature of a direct-current generator *g*, employed to generate a direct current, which is utilized on a direct-current circuit. The direct-current circuit is shown in Fig. 1 as the well-known three-wire circuit, comprising the positive wire *i*, the negative wire *j*, and the neutral wire *k*, the positive wire *i* being connected to one commutator-brush *m* of the generator *g* by the conductor *n*, containing a starting resistance or rheostat *o* and fuse *p*, and the negative wire *j* being connected with the other brush *r* by the conductor *s*, containing the switch *t*. The wires or conductors *n s* are also connected by the wires 10 12 with the field-coil 13 of the generator *g*, the wire 12 containing a rheostat 14, which is designated the "field-rheostat." The wires *a*, *b*, and *c* of the three-phase primary circuit are connected with the induction-motor *e* by the conductors 16 17 18, containing the three-pole switch 19. The three-wire circuit *i j k* is supplied with current, as represented in Fig. 1, from the direct-current generators 20 21, which are connected by the wires 22 23 24 with the wires *i j k*.

The circuits and apparatus as thus far described are such as now commonly employed in electric-lighting systems. In the practical operation of the system as thus far described the alternating current from the main or primary circuit *a*, *b*, *c* is employed to operate the motor *e*, which in turn drives the armature of the generator *g*, the current from which is fed to the positive and negative wires *i j* of the three-wire distributing system to augment the direct current of said distributing system, and it is desirable that before the induction-motor is connected with the primary circuit *a*, *b*, *c* that the speed of said motor should be such that it may be connected to said primary circuit with safety. In practice the induction-motor *e* is driven by the generator *g*, which latter is used as a motor when the switch *t* is closed, and said induction-motor is allowed to attain a synchronous speed with relation to the primary alternating circuit or generator before the switch 19 is closed to connect the induction-motor with the primary alternating circuit.

To avoid accidents and interruptions of the system, it is desirable that the induction-motor should attain a predetermined speed before it is connected with the primary circuit, and the present invention has for its object to provide means whereby it may be made known to the operator when the induction-motor has attained the proper or desired speed to permit it to be connected with the primary alternating circuit with safety. For this purpose I provide means for converting a direct current into an alternating current and cause said alternating current to act on a translating device in opposition to or in conjunction with an alternating current derived from the primary alternating circuit. The converting means may be made as herein shown and consists of two sets of fingers 30 31, attached to conducting-rings 32 33, secured upon a sleeve or hub 34, (see Fig. 5,) which is rotated from the shaft $f$. As herein represented, the conducting-rings 32 33 and their attached fingers 30 31 are electrically separated from each other by insulating material 36, which may form part of the sleeve or hub 34, the said fingers extending toward each other and overlapping, as clearly represented in the drawings, so as to make contact with one or more brushes 37 38. In Figs. 1 and 2 the fingers 30 31 coöperate with two brushes 37 38, forming the terminals of a secondary circuit of a transformer 39, the said secondary circuit comprising the secondary winding 40 and the wires 41 42 and including the translating devices, preferably incandescent lamps 43. The primary winding 44 of the transformer 39 is connected by the wires 45 46 to the wires 17 18. The conducting-rings 32 33 have coöperating with them brushes 48 49, which are connected by wires 50 51 to the positive and negative wires $i\ j$ of the direct-current circuit. As represented in Fig. 1, the wires 50 51 include the lamps 52, which serve to cut down the voltage from two hundred and twenty, which is the drop between the wires $i\ j$, to one hundred and ten, the drop between the wires $i\ k$ or $k\ j$. In Fig. 1 the neutral wire $k$ is shown as grounded at 55, as usually practiced in the Edison three-wire system of distribution, and the wire 41 is also grounded at 56, so that the present invention may conform to and work in harmony with the usual conditions of the three-wire system. If the neutral of the three-wire system is not grounded, the ground 56 is omitted and a metallic connection is made between the brush 38 and the neutral $k$, as represented in Fig. 4.

The operation of the apparatus shown in Fig. 1 may be briefly described, as follows: Assume the switches $t$ 19 open, as shown in the drawings. In this case the induction-motor $e$ and generator $g$ are at rest. Let it be supposed that it is desired to supply direct currrent to the direct-current circuit $i\ j\ k$, which in the present instance is alive and furnished with current from the direct-current generators 20 21. In this case the operator closes the switch $t$ and operates the starting-switch or rheostat $o$, thereby connecting the generator with the direct-current circuit, with the result that the generator is run as a motor and the shaft $f$ is rotated, thereby effecting rotation of the induction-motor $e$ and the sleeve or hub 34. The direct current from the direct-current circuit flows to the conducting-rings 32 33 and is converted into an alternating current by the positive and negative fingers 30 31, alternately making contact with each of the brushes 38 37, so that a positive impulse followed by a negative impulse is transmitted to the lamps 43 over the wire 42 and a negative impulse followed by a positive impulse is transmitted to the lamps 43 over the wire 41, which impulses oppose or agree with the impulses of the alternating current derived from the primary alternating circuit and transmitted to the lamps 43 from the transformer 39. When impulses from the converter meet in the lamps 43 impulses of unlike sign from the transformer, the lamps are lighted, and when the impulses from the converter meet impulses of like sign from the transformer the lamps are not lighted. As the speed of the induction-motor increases up to the point of synchronism with relation to the primary alternating circuit the light in the lamp fluctuates, and when the synchronous condition is attained the lamp will become steady, either being out or burning brilliantly and steady, and when the lamp shows either of these two conditions it indicates to the operator that he can with safety throw the switch 19, and thereby connect the induction-motor with the primary alternating circuit. The synchronous condition of the induction-motor may be obtained by manipulating the field-rheostat 14 of the generator $g$ when the latter is running as a motor. When the induction-motor is connected in circuit with the primary alternating circuit, the field-rheostat 14 is then manipulated to cause the induction-motor to take a load and reverse the action of the direct-current machine, which is then run as a generator and supplies current to the direct-current circuit.

The mechanical converter may be provided with any desired number of fingers 30 31, depending upon the frequency of the primary alternating circuit and the speed of the induction-motor. In the present instance the converter is shown in Fig. 6 as provided with eighteen fingers, nine positive and nine negative, which number is suitable for an induction-motor of sixty cycles and four hundred revolutions; but, as above stated, this number may be varied to suit conditions.

In Fig. 2 the invention is shown in a system in which the direct-current circuit is a metallic circuit and in which the ground connections shown in Fig. 1 are omitted. In other respects the system shown in Fig. 2 is the same as shown in Fig. 1, and the operation of the mechanical converter is the same.

In Fig. 3 the invention is shown in a system in which the direct-current circuit is shown as a grounded three-wire circuit which may be fed with current from either of two independent alternating primary circuits, the circuit *a b c* having connected with it the primary of the transformer 39 and the circuit 60 61 62 having connected with it the primary of the transformer 64. The secondary windings 40 65 of the said transformers have one side connected to a common ground 66 and their other sides connected to the terminals 67 68 of a double-throw three-pole switch 69, which in one position connects the terminal 67 with terminal 70, to which the brush 38 is connected by the wire 71, including the lamps 43, and in the other position connects the terminal 68 with the terminal 70. In either case the lamps are included in one side of the secondary circuit rather than in both sides, as shown in Fig. 1. In the system represented in Fig. 3 one alternating circuit, as 60 61 62, is auxiliary to the other circuit *a b c*, and only one of the alternating circuits is designed to be used at a single time, the other being held in reserve in case of accident to the first-mentioned alternating circuit. The station apparatus, including the induction-motor *e*, generator *g*, switch *t*, resistances *o* and 14, are used with the circuits *a b c* and 60 61 62, and a switch 19 is employed with each of said circuits for connecting the motor *e* with either of said circuits. In Fig. 3 the switch 69 is shown, which in practice would be used to open the circuits from the direct-current system and from the secondary of the alternating current, which include the converting apparatus. The purpose of the switch 69 is to save current by opening the circuits, including the converting apparatus, when the switch 19 is closed to include the induction-motor in the alternating circuit. In Fig. 3 the circuit through the lamps 43 may be traced as follows: from wire 40 to terminal 67, through the blade 80 of switch 69 to terminal 70, wire 71, lamps 43 to brush 38, finger 30, ring 32, brush 48 to blade 81 of switch 69, terminal 82, wire 83 to positive wire *i*, wire 22, generator 20, wire 24 to neutral *k*, thence to ground 66, with which the secondary winding 40 is connected.

In Fig. 4 the converting apparatus is the same as that shown in Fig. 3, and the direct-current circuit is a metallic circuit having its neutral wire *k* connected by wire 85 with the secondary winding 40 of the transformer 39. The switch 69 shown in Fig. 3 is omitted from Fig. 4. The circuit in Fig. 4 may be traced as follows: from the wire 40, through the lamps 43 to brush 38, finger 30, ring 32, brush 48, through lamp 52 to negative wire *i*, thence by wire 22, through generator 20, wire 24, wire 85 to wire 40 of transformer 39.

I have herein represented the indicating device as an incandescent lamp, and while I may prefer to employ such lamp I do not desire to limit my invention to this particular form of indicating device.

In Figs. 3 and 4 the distributing system is supplied with direct current, as represented in Fig. 1, and in Fig. 2 the distributing system is shown as a two-wire metallic circuit and may be supplied with direct current by a single dynamo, such as 20 or 21. (Shown in Fig. 1.)

I claim—

1. In a system of electrical distribution, in combination, a primary alternating-current circuit, an induction-motor supplied with current from said primary circuit, a circuit-controller governing the circuit of said motor, a direct-current generator driven by said induction-motor, a direct-current circuit supplied with current from said generator, a circuit-controller governing the circuit of said generator, a mechanical converter rotatable with said induction-motor and electrically connected with said primary alternating circuit and with a source of direct current, and an indicating device included in circuit with said converter, for the purpose specified.

2. In a system of electrical distribution, in combination, a primary alternating-current circuit, an induction-motor supplied with current from said primary circuit, a circuit-controller governing the circuit of said motor, a direct-current generator driven by said induction-motor, a direct-current circuit supplied with current from said generator, a circuit-controller governing the circuit of said generator, a mechanical converter mounted on the shaft of the induction-motor and electrically connected with said primary alternating circuit and with a source of direct current.

3. In a system of electrical distribution, in combination, an alternating-current circuit, a motor supplied with current from said circuit, means to control the circuit of said motor, a mechanical converter rotatable with said motor and electrically connected with said alternating circuit and with a source of direct current, and an indicating device included in circuit with said converter.

4. In a system of electrical distribution, in combination, an alternating-current circuit, a source of alternating current connected therewith, a direct-current circuit, a source of direct current independent of the alternating current connected with said direct-current circuit, a rotatable mechanical converter connected with both circuits, means to rotate said converter, and a translating device included in circuit with said converter, for the purpose specified.

5. In a system of electrical distribution, in combination, an alternating-current circuit, a source of alternating current connected therewith, a direct-current circuit, a source of direct current connected with said direct-current circuit, and means electrically connected in circuit with said alternating-current circuit and with said direct-current circuit to convert said direct current into an alternating current which coöperates with the alternating current of the alternating circuit, for the purpose specified.

6. In a system of electrical distribution, in combination, an alternating-current circuit, a source of alternating current connected therewith, a direct-current circuit, a source of direct current connected with said direct-current circuit, a transformer having one winding connected with the alternating circuit, means connected with said direct-current circuit and with the second winding of said transformer to convert said direct current into an alternating current which coöperates with the alternating current of said second winding, and a translating device in said second winding, substantially as described.

7. In a system of electrical distribution, in combination, an alternating-current circuit, a source of alternating current connected therewith, a direct-current circuit, a source of direct current connected with said direct-current circuit, a translating device connected in circuit with said alternating-current circuit and with said direct-current circuit and wherein said currents are opposed, and means to convert one of said currents into the other of said currents whereby the translating device is caused to respond to the converted current, substantially as described.

In testimony whereof I have signed my name to this specification in the presence of two subscribing witnesses.

JOHN H. ANDERTON.

Witnesses:
JAS. H. CHURCHILL,
J. MURPHY.